J. T. HAGERTY.
Draft Equalizer.
No. 92,042.
Patented June 29, 1869.
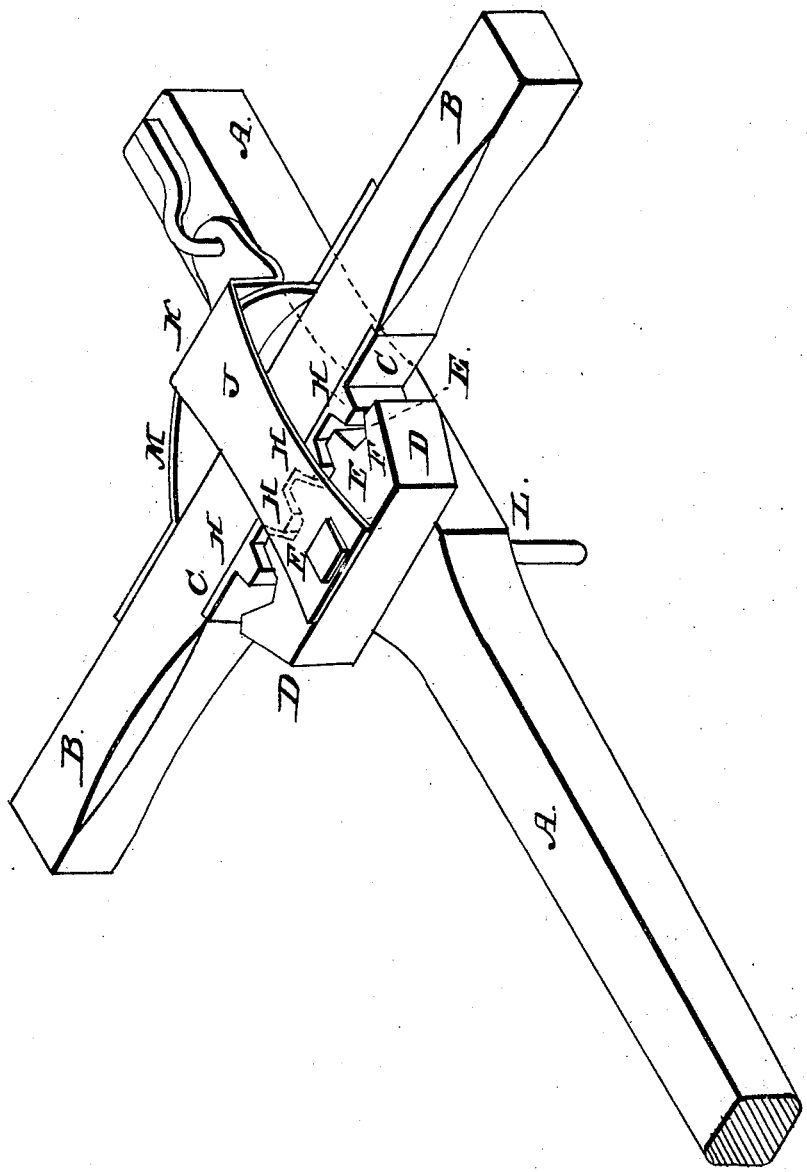
Witnesses
J. H. Phillips
Daniel Rugart
Inventor
John T. Hagerty
By his Atty, J. F. Reigart

United States Patent Office.

JOHN T. HAGERTY, OF CAMP POINT, ILLINOIS.

Letters Patent No. 92,042, dated June 29, 1869.

---

IMPROVEMENT IN SELF-ADJUSTING EQUALIZER FOR PLOWS, &c.

---

The Schedule referred to in these Letters Patent and making part of the same.

---

*To all whom it may concern:*

Be it known that I, JOHN T. HAGERTY, of Camp Point, county of Adams, and State of Illinois, have invented an Improved Whiffletree for Farm-Wagons, or Self-Adjusting Equalizer for Plows, Seeding-Machines, or Cultivators; and I hereby declare the following to be an exact description thereof, reference being had to the accompanying drawings, and to the letters of reference marked thereon, making a part of this specification.

The nature of my invention consists in the construction of a double rack in front of the double-tree, or whiffletree, in combination with the hammer-strap and wagon-pole, operating as an equalizer of the strain on the tree and pole.

To enable others skilled in the art to make and use my invention, I describe it as follows:

A represents the pole of any kind of a wagon, plow, or farm-machine drawn by horses or oxen.

B, the double-tree, or whiffletree, to which the horses are attached. The double-tree, (instead of being secured, as heretofore, to the pole by a strong bolt or coupling-pin,) operates independently on top of the pole, or tongue, and has, on its front side, at the centre, a strong toothed plate, or cast-iron rack, C.

In front of this rack C, is a solid cast-iron rack, D, with its teeth arranged in the segment of a circle, so that the teeth E play and operate between the teeth H of the rack C, to relieve and equalize the draught; as, for instance, when one of the horses is stronger than the other, the draught is regulated by the teeth interlocking on the one side, and preventing the pull from being only on one side or end of the double-tree; or, if one horse slips, or loses his footing, and falls behind the other, it gives him the advantage until he gets even with the other; or, in case one horse should have the advantage, (which is often necessary,) I raise the hammer-strap J, and slip over one or two cogs, or teeth to the right or to the left, and I equalize the strain.

The hammer-strap J is attached by a strong iron loop, or hinge to the pole A, in the rear of the double-tree B, is bent up squarely at K, and then rests flat upon the upper side of the double-tree B, and has a strong square-headed bolt, L, passing through it and the rack D and the pole A, thus firmly securing the double-tree B, the hammer-strap J, and rack D to the pole A.

A circular guide-bar, M, is permanently fastened to the rear side of the double-tree B, so as to rest against the square side K of the hammer-strap J, which likewise assists in keeping the double-tree in its proper position with the rack-teeth E and H.

What I claim as my invention, and desire to secure by Letters Patent, is—

The construction of the double rack D and C, in front of the double or whiffletree B, in combination with the hammer-strap J, guard M, and pole A, when constructed, arranged, and operating so as to equalize the strain on the double-tree, as herein described, and for the purpose set forth.

JOHN T. HAGERTY.

Witnesses:
JOSEPH LITTLE,
DANIEL CONNER.